United States Patent [19]

Takao et al.

[11] 4,387,562
[45] Jun. 14, 1983

[54] SYSTEM FOR GENERATING POWER WITH TOP PRESSURE OF BLAST FURNACES

[75] Inventors: Kengo Takao, Kitakyushu; Mineo Ohmachi, Mitaka; Hisatsugu Kihara; Kenshiro Toki, both of Sakai; Yukio Tomita, Osaka; Toshihiro Mizota, Sennan, all of Japan

[73] Assignees: Nippon Steel Corporation, Tokyo; Hitachi Shipbuilding & Engineering Company Limited, Osaka, both of Japan

[21] Appl. No.: 176,484

[22] Filed: Aug. 8, 1980

[51] Int. Cl.³ .............................................. F02C 6/02
[52] U.S. Cl. ................................... 60/39.15; 266/144
[58] Field of Search ............... 60/39.02, 39.07, 39.15; 266/144, 157, 159

[56] References Cited

U.S. PATENT DOCUMENTS 2,131,031 9/1938 Avery .................................. 60/39.12
4,072,006 2/1978 Inubushi et al. ................... 60/39.02

FOREIGN PATENT DOCUMENTS

532400 1/1958 Belgium .
2702440 7/1978 Fed. Rep. of Germany .

Primary Examiner—Louis J. Casaregola
Attorney, Agent, or Firm—Joseph W. Farley

[57] ABSTRACT

A system for generating power with the top pressure of a plurality of blast furnaces by leading a gas from the top of the furnaces into turbines, corresponding in number to the furnaces, to convert the pressure of the gas into rotational energy and generate power by a generator coupled to the turbines. The turbines connected to the furnaces by main gas channels individually are aligned with their rotor shafts connected together into a single shaft which is connected to the generator. Preferably each pair of the adjacent turbines are arranged with their intake ends positioned in the center of the arrangement so that the gas flows toward the exhaust ends at both sides, or with their intake ends positioned at both sides to cause the gas to flow toward the exhaust ends in the center. The single shaft connecting the pair of turbines together has no intermediate bearing between these turbines.

8 Claims, 8 Drawing Figures

SYSTEM FOR GENERATING POWER WITH TOP PRESSURE OF BLAST FURNACES

This invention relates to a system for generating power with the energy recovered from the gas discharged from the top of blast furnaces, more particularly to a system (hereinafter referred to as "TRT") in which blast furnace gas is fed to gas turbines for driving a power generator. Specifically stated, the invention relates to such TRT adapted for use with a plurality of blast furnaces.

TRT's heretofore known comprise a gas turbine and a generator provided for each of a plurality of blast furnaces. The installation of TRT's and like energy saving equipment is dependent largely on the ratio of the equipment cost relative to the benefit obtained therefrom, namely, on the efficiency of investment. Accordingly TRT's have been installed for large-scale blast furnaces of the order of 4,000 $m^3$ in capacity which assure a high investment efficiency, but none of such systems are provided for medium- to small-scale blast furnaces up to 3,000 $m^3$ in capacity because of the small amount of recoverable energy and high equipment cost relative to the small capacity which lead to a poor investment efficiency and commercial infeasibility.

It appears useful to install a gas turbine and a generator for a plurality of blast furnaces. When the plurality of blast furnaces are operated under the same pressure condition in this case, the inlet pressure of the first nozzle of the turbine may be set at an upper limit corresponding to the pressure condition. In practice, however, when the blast furnaces have different top pressures, the first nozzle of the turbine must almost invariably be set to a reduced inlet pressure in accordance with the lower top pressure as will be described in detail later with reference to drawings. This method nevertheless involves a low energy recovery efficiency since it is critical to minimize the pressure loss for efficient recovery of energy. Additionally the system requires a complex mode of control and needs a considerable period of adjustment to avoid the possible influence on the blast furnaces.

An object of this invention is to make it possible to recover energy from the top pressure of a plurality of blast furnaces with a single TRT and to provide a system which assures a high investment efficiency. Another object of the invention is to provide such a system which is capable of recovering energy efficiently for generating power with a minimized pressure loss even when the blast furnaces have varying top pressures.

To fulfill these objects, the present invention provides a system for generating power with the top pressure of a plurality of blast furnaces, the system comprising a plurality of turbines disposed at one location and each connected to the corresponding one of the furnaces with a main gas channel, the turbines being aligned with their rotor shafts connected to one another into a single shaft, a generator being coupled to the single shaft.

According to a preferred embodiment of the invention, a pair of adjacent turbines are arranged with their intake ends positioned in the center of the arrangement so that the gas flows toward the exhaust ends at both sides, or with their intake ends positioned at both sides to cause the gas to flow toward the exhaust ends in the center. The rotor shafts of the turbines are connected to each other in the form of a single shaft having no intermediate bearing. When the gas is adapted to flow toward both sides, a simple partition is provided between the turbines, which eliminates the problem that would result from the difference in gas pressure, if any, between the turbines. Since the gas has a fully reduced pressure at opposite outer ends of the rotor shafts, even a simple gas seal will effectively prevent the leakage of the gas. When the gas is adapted to flow toward the center, the exhaust ends in the center have a reduced gas pressure, so that the pressure difference between the exhaust ends can be minimized under any operating condition. Thus the leak of gas from one turbine to the other can be minimized without the necessity of providing a seal therebetween, thereby achieving an improved energy recovery efficiency. This is especially advantageous when one of the furnaces becomes unable to feed the gas to the corresponding turbine and brings that turbine out of operation. The exhaust ends are each provided with an outlet chamber and connected to a duct communicating with the chambers for allowing the streams of exhaust gas through the ends to flow together. Preferably the confluence duct has guide plates for preventing eddy flows and a perforated partition plate for the exhaust gas streams to partially flow therethrough toward each other at a location upstream from the point of confluence so as to preclude noises that would result when the streams are out of balance with each other.

According to another preferred embodiment of the invention, a control valve is mounted on the main gas channel for each of the turbines. The control valves are selectively controllable by a speed control device, whereby when the generator is coupled to the power network of a plant, the speed of rotation of the turbines can be controlled to bring the frequency of the power from the generator into agreement with that of the power network for a trouble-free operation. Moreover this enables an optionally selected turbine to start up the generator, such that troubles are avoidable, for example, when some of the furnaces are held out of operation. After the generator has been coupled to the power network which is usually exceedingly larger than the generator in capacity, the frequency control for the generator is effected at somewhere on the network, and there is no need to control the speed of the system independently unless the power from the generator is used independently for some application or fed to a power network of small capacity. Further preferably, the control valve is spaced from the turbine to cause the gas channel portion therebetween to serve as an accumulator so that the variations in the amount of gas from the furnace will not act as pressure variations directly on the turbine nozzle. In this case, an emergency shut-off valve is disposed at a position immediately upstream from the turbine, such that when the generator is unloaded, the emergency shut-off valve is closed before operating the control valve to assure safety for the turbine.

According to another preferred embodiment of the invention, two desired main gas channels are interconnected by a channel provided with a flow control valve. When the supply of gas from a blast furnace is interrupted, the turbine corresponding to that furnace is idly rotated by the other turbines, with the result that the interior of the idly rotated turbine will be overheated. In such an event, the flow control valve on the connecting channel is opened to feed gas to that turbine from another furnace at a rate of about 3% of the rated flow rate to cool the interior. Further if the cooling gas is merely fed to the turbine in this case, the energy of the gas will be lost uselessly due to the pressure reduction. Stated more specifically, since the inlet pressure at the first nozzle of the turbine remains about 3% of the rated flow rate, about 97% of the pressure of the introduced gas will be wasted as a pressure reduction loss. Preferably, therefore, the intake end of the turbine is provided with a movable nozzle, which is closed when the flow control valve is opened. This increases the inlet pressure of the first nozzle to prevent overheating and provide energy needed for idle rotation.

According to another preferred embodiment, the control valve on each main gas channel is replaced by a movable nozzle at the intake end of the turbine for controlling the top pressure of the furnace. Thus in the case of TRT's which handle gas at a relatively low pressure and high flow rate, the top pressure is controllable only by the movable nozzle. Because the no load flow ratio (the ratio of a flow rate relative to the flow rate for full-load operation at the rated speed) reaches 30 to 50%, the top pressure can be controlled by suitably opening the nozzle without giving any pressure reduction loss. With TRT's, however, the top pressure varies over the range of about 0.5 kg/cm$^2$ to about 2.5 kg/cm$^2$ as measured at the inlet of the turbine, so that at higher pressures, the no load flow ratio reduces to about 10%, in which case difficulties will be encountered in the speed control with the movable nozzle when the generator is to be started up unless some special expedient is used. Accordingly the main gas channels connecting the blast furnaces to the turbines are interconnected with a channel provided with a flow control valve for giving a pressure reduction loss, such that the furnace top gas is fed to the turbine through the flow control valve to effect speed control through the flow control valve and movable nozzle.

Various other features and advantages of the invention will become apparent from the following description of the preferred embodiments given with reference to the accompanying drawings, in which:

Figure 1:
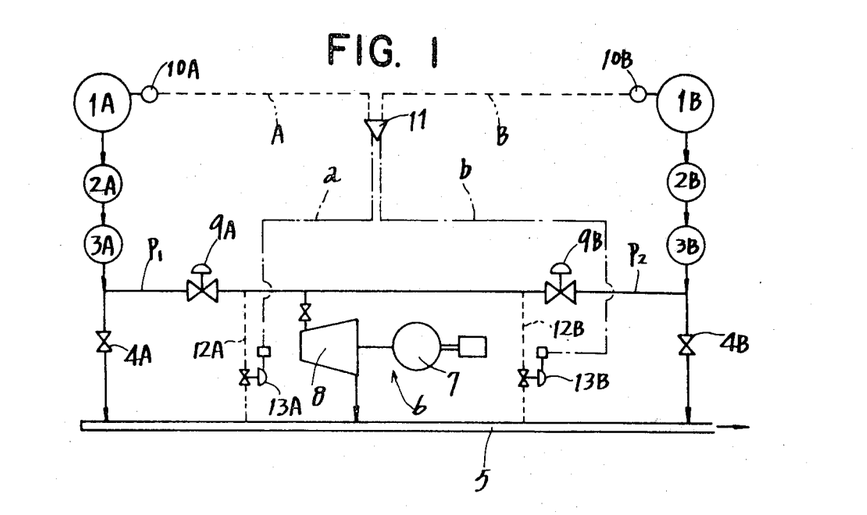
FIG. 1 is a diagram showing a TRT an improvement of which this invention provides.

With reference to FIG. 1, a system will be described first which is conceivable when it is desired to effectively generate power with the top pressure of a plurality of blast furnaces. The system comprises two blast furnaces 1A, 1B and a gas turbine 8 in combination therewith. The gas discharged from the top of the furnaces is passed through venturi scrubbers 2A, 2B and 3A, 3B, adjusted in pressure by septum valves (pressure adjusting valves) 4A, 4B and then led into a main gas pipe 5. A generating unit 6 disposed in parallel to the septum valves 4A, 4B is incorporated in a power network and is loaded through the network. The unit includes a generator 7 which is driven by the gas turbine 8 of the single flow type. At the inlets of the septum valves 4A, 4B, the gas is fed through control valves 9A, 9B to the turbine 8 to drive the turbine and thereafter flows into the main gas pipe 5. When the two blast furnaces 1A, 1B are operated under different pressure conditions with this arrangement, detecting signals A, B from top pressure control devices 10A, 10B are compared in a comparator 11. Speed adjusting valves 13A, 13B are provided on bypass channels 12A, 12B extending from the outlets of the control valves 9A, 9B to the main gas pipe 5. In response to a control signal a or b from the comparator 11, one of the speed adjusting valves corresponding to the furnace of higher pressure is opened to adjust the top pressure of the furnace to the lower top pressure to set the inlet pressure at the first nozzle of the turbine. The problems described above therefore arise.

Figure 2:
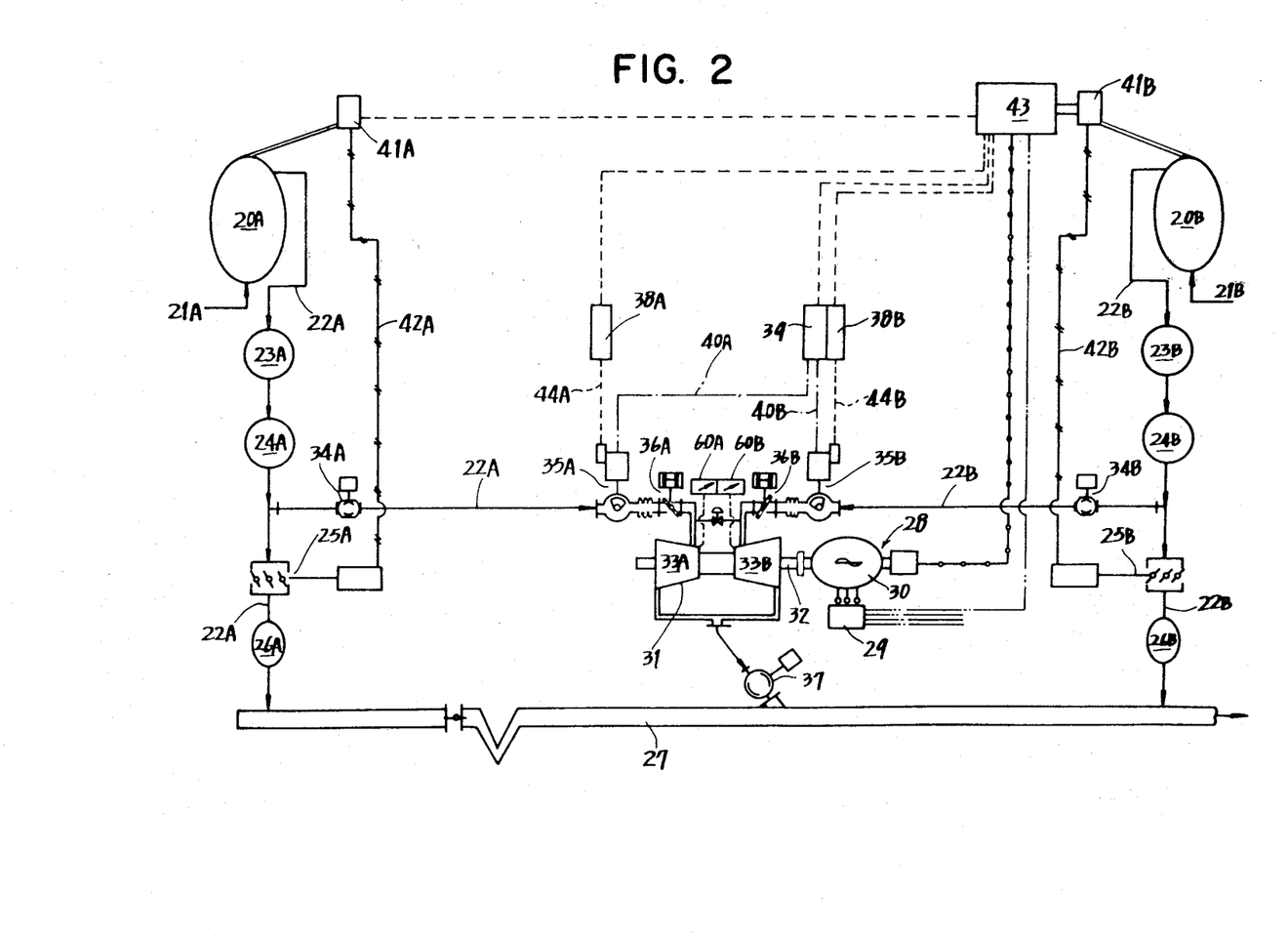
FIG. 2 is a system diagram showing a first embodiment of the invention.
Figure 3:
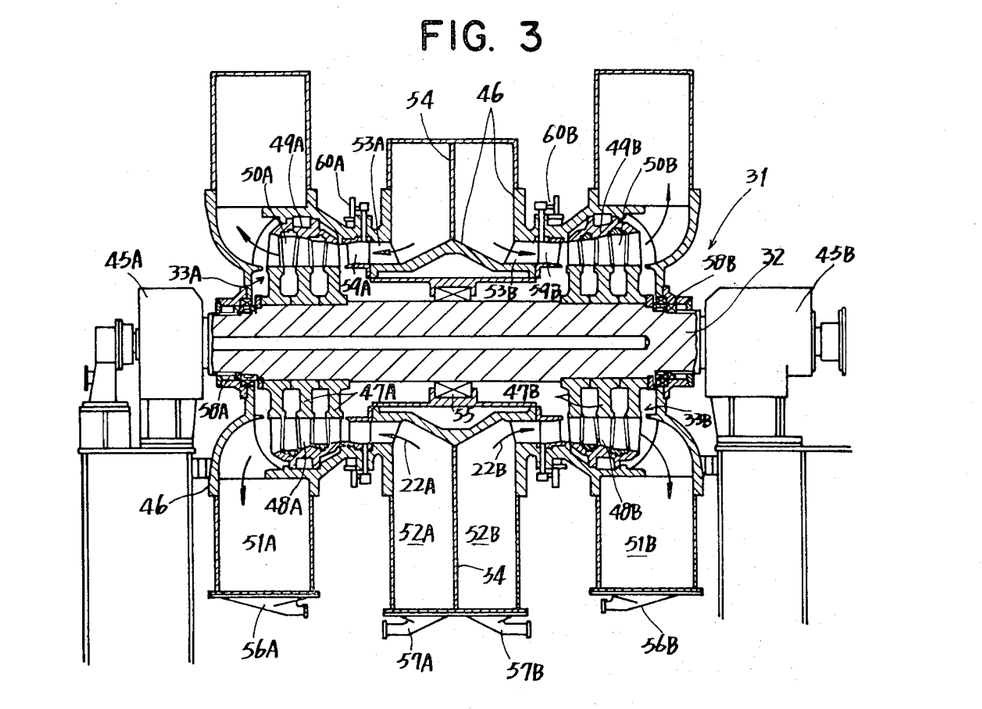
FIG. 3 is a front view in vertical section showing a turbine assembly included in the first embodiment.

These problems have been overcome with the first embodiment of the invention shown in FIGS. 2 and 3. Although this embodiment will be described as having two blast furnaces for a simplified description, the system will operate similarly when having three or more blast furnaces. With reference to FIG. 2, air streams 21A, 21B are fed to blast furnaces 20A, 20B from an unillustrated blower during operation. The furnaces discharge from their top portions gas streams 22A, 22B, which are passed through venturi scrubbers 23A, 23B and 24A, 24B, adjusted in pressure by septum valves (pressure adjusting valves) 25A, 25B and then led through dust collectors 26A, 26B into a main gas pipe 27. A generating unit 28 disposed in parallel to the septum valves 25A, 25B is coupled through a breaker 29 to a power network and is thereby loaded. A turbine assembly 31 for driving the generator 30 of the unit is of the double flow type and comprises a pair of turbines 33A, 33B axially aligned with each other and connected together by a single turbine rotor 32. At the inlets of the septum valves 25A, 25B, the gas streams 22A, 22B are passed through inlet shut-off valves 34A, 34B, control valves 35A, 35B and emergency shut-off valves (butterfly valves) 36A, 36B to an intermediate portion of the rotor 32 individually. The gas stream 22A is fed to the turbine 33A, and the other gas stream 22B to the other turbine 33B. The gas used for the turbines 33A, 33B flows through an outlet shut-off valve 37 into the main gas pipe 27. The control valves 35A, 35B are controllable by pressure control devices 38A, 38B respectively. A speed control device 39 gives signals 40A, 40B for selectively controlling the valves 35A, 35B. The emergency shut-off valves 36A, 36B are adapted to be operated before the control valves 35A, 35B when the generator 30 is to be unloaded. Since the top pressures of the blast furnaces must be kept constant to the greatest possible extent during operation, the septum valves 25A, 25B are automatically controllable to the desired degree of opening by control signals 42A, 42B from top pressure control devices 41A, 41B for detecting the output pressures of the furnaces 20A, 20B, and the control valves 35A, 35B are automatically controllable to the desired degree of opening by control signals 44A, 44B given by an automatic operation monitoring control panel 43 through the pressure control devices 38A, 38B. As seen in FIG. 3, the turbine assembly 31 has its rotor 32 supported at opposite ends by a pair of bearings 45A, 45B. Disposed between the rotor 32 and a fixed outer cylinder 46 are movable blades 48A, 48B attached to the rotor 32 by disks 47A, 47B, and stationary blades 50A, 50B attached to the outer cylinder 46 by annular members 49A, 49B. Thus the turbine assembly 31 comprises the pair of turbines 33A, 33B. The exhaust ends (outer ends) of the turbines 33A, 33B are in communication with outlet chambers 51A, 51B provided by members connected to the outer cylinder 46, while the intake ends (inner ends) thereof communicate through passages 53A, 53B with inlet chambers 52A, 52B defined by members connected to the cylinder 46. The two inlet chambers 52A, 52B are separated by a partition wall 54. An axially middle partition 55 between the outer cylinder 46 and the rotor 32 comprises means of simple construction, such as a labyrinth or water seal ring. Indicated at 56A, 56B are dust collectors for the outlet chambers 51A, 51B, and at 57A, 57B dust collectors for the inlet chambers 52A, 52B. Gas seals 58A, 59B are provided between the outer cylinder 46 and both ends of the rotor 32. The communication passages 53A, 53B are provided with movable blades 59A, 59B providing first movable nozzles and with means 60A, 60B for setting the opening of the nozzles.

The present system will operate in the following manner. Before starting up the system, the blast furnaces 20A, 20B are in operation, with the septum valves 25A, 25B automatically controlling the top pressures of the furnaces. When initiating the power generating system, the emergency shut-off valves 36A, 36B are fully opened by a start-up signal. Subsequently the control valves 35A, 35B are gradually opened to automatically increase the speed of the rotor 32. When the number of revolutions of the rotor has reached to that desired for the generator 30, one of the control valves 35A, 35B is controlled by the speed control device 39 to set the turbine assembly at the desired number of revolutions corresponding to the frequency of the power to be generated, whereupon the generating unit 28 is automatically incorporated into the power network for synchronized operation. The control valves 35A, 35B are thereafter further opened to automatically increase the output of the generator 30. After the top pressures have been controlled with use of the septum valves 25A, 25B and control valves 35A, 35B, the septum valves 25A, 25B are closed (locked), permitting the control valve 35A, 35B alone to operate for the top pressure control. The system is now in operation as contemplated. When bringing the system out of operation, the septum valves 25A, 25B are unlocked by a stop signal to control the top pressures by the septum valves and control valves 35A, 35B. Immediately thereafter, the system is changed over for top pressure control with use of the septum valves 25A, 25B only, such that the output of the generator 30 is automatically reduced by controlling the valves 25A, 25B. When the output of the generator 30 has dropped almost to zero, the generator will be cut off from the load. However, simultaneously with the unloading, the channel portions between the turbine assembly 31 and the control valves 35A, 35B are likely to act as an accumulator, possibly giving excessive input to the unloaded turbine assembly. Accordingly the emergency shut-off valves 36A, 36B are closed before unloading. The rotor 32 thereafter automatically decelerates and then comes to a halt.

Although the embodiment has been described above in the case where both furnaces 20A, 20B are in operation, the system is operable for the desired power generation when one of the furnaces is out of operation, by closing the emergency shut-off valve for the non-operative furnace and controlling the control valve for the operating furnace with the speed control device 39 for starting up the system. Further even when the two furnaces are in operation, the system can be operated only with one of the turbines before the generating unit 28 is brought into synchronized operation.

While the gas turbine assembly 31 is in operation, the gas streams 22A, 22B are guided by the inlet chambers 52A, 52B to the outer periphery of the middle portion of the rotor 32, divided by the partition wall 54 away from each other and fed to the turbines 33A, 33B respectively to cause the movable blades 48A, 48B to rotate the rotor 32. The gas thereafter flows out through the outlet chambers 51A, 51B. Although the gas streams 22A, 22B have a high pressure in the vicinity of the inlet chambers 52A, 52B, the gas, if leaking through the partition 55, will produce no problem since it is fed at a position close to intermediate portions of the rotor 32. Further because the gas has a fully reduced pressure in the vicinity of outlet chambers 51A, 51B, the gas will not leak even when the gas seals 58A, 58B are simple and inexpensive ones.

A modification of the turbine assembly will be described with reference to FIG. 4. The modified turbine assembly 70 differs from that of FIG. 3 in that it has inlets at opposite sides and outlets in the center. A turbine rotor 71 is supported at its opposite ends by a pair of bearings 72A, 72B. Disposed between the rotor 71 and a pair of fixed outer cylinders 73A, 73B surrounding the rotor are movable blades 74A, 74B attached to the rotor 71 and stationary blades 75A, 75B attached to the cylinders 73A, 73B to provide a pair of turbines 76A, 76B aligned with each other in the axial direction. Gas inlet chambers 77A, 77B at intake outer ends of the turbines 76A, 76B are formed by members attached to the outer cylinders 73A, 73B. The inlet chambers 77A, 77B communicate through passages 78A, 78B with the intake ends of the turbines 76A, 76B. The communication passages 78A, 78B are provided with movable blades 79A, 79B providing first movable nozzles. The angles of these blades are settable or adjustable by suitable means 80A, 80B. The turbines 76A, 76B are provided at their inner exhaust ends with gas outlet chambers 81A, 81B formed by members attached to the outer cylinders 73A, 73B and separated by a partition wall 82. In opposed relation to the exhaust ends of the turbines 76A, 76B, the outlet chambers 81A, 81B are provided with flow guide walls 83A, 83B by which the exhaust gas streams from the exhaust ends are guided into the chambers 81A, 81B without interfering with each other. When desired, the partition wall 82 is formed with apertures 84 disposed downstream from the guide walls 83A, 83B for holding the exhaust gas streams from the turbines 76A, 76B in balance. Gas seals 85A, 85B are provided between both ends of the rotor 71 and outer side portions of the cylinders 73A, 73B.

The gas streams fed to the inlet chambers 77A, 77B are led into the turbines 76A, 76B without leaking, then flow to the midportion of the rotor and thereafter are conducted to the outlet chambers 81A, 81B while being prevented from interfering with each other by the guide walls 83A, 83B. Consequently the pressure difference between the turbines 76A, 76B occurring on the surface of the rotor 71 between the outlet chambers 81A, 81B can be minimized under any operating condition, and the leaks of gas flowing through the turbines 76A, 76B can be reduced. This assures an improved energy recovery efficiency under any operating condition.

Figure 4:
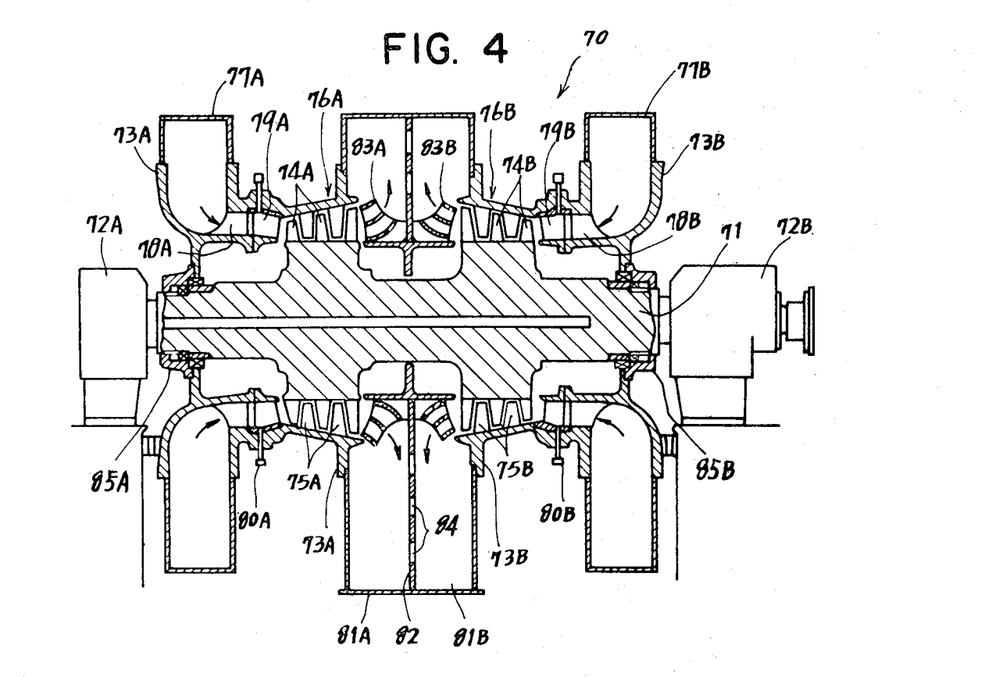
FIG. 4 is a front view in vertical section showing a modification of the turbine assembly.
Figure 5:
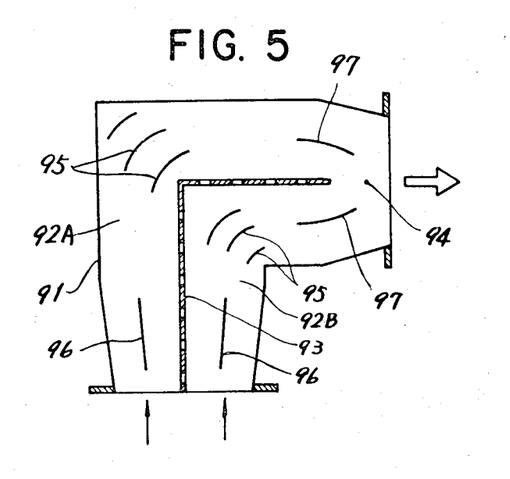
FIG. 5 is a view in vertical section showing a confluence duct which can be connected to the turbine assembly.

The exhaust gas streams through the outlet chambers 51A, 51B or 81A, 81B of the turbine assembly in FIG. 3 or 4 are caused to flow together by a confluence duct 5 and then led into a gas holder or the like. If eddy currents occur in the combined flow, such currents will give an increased pressure to the outlets of the turbines and lead to a reduced energy recovery efficiency, so that the confluence duct is designed to prevent occurrence of such eddy currents. FIG. 5 shows an embodiment of the duct. A bent duct main body 91 has a perforated partition plate 93 for dividing the interior of the main body into two gas channels 92A, 92B. The duct has a point of confluence, 94, downstream from the partition plate 93, and bent guide plates 95 at the bent portion. Indicated at 96 are upstream guide plates, and at 97 downstream guide plates. It is of course possible to provide three or more gas channels.

With this arrangement, the large number of (circular, rectangular or like) openings of the perforated partition plate 93 (which may alternatively be a net) are arranged to afford an enhanced attenuating effect in accordance with the frequency characteristics given by the properties of the plate, shape of the openings, etc. When the gas streams are out of balance, the bent portion and the perforated partition plate 93 coact to permit about 10% of the gas to pass through the openings upstream from the confluence point 94 to prevent occurrence of noises. These openings produce a greater effect than the apertures 84 formed in the partition wall 82 shown in FIG. 4. On the other hand, the main gas streams are regulated by the bent guide plates 95 in the bent portion before reaching the confluence point 94 to reduce the pressure loss that would result from passage through the bent portion, thus reducing the pressure loss due to the occurrence of eddy flows.

Figure 6:
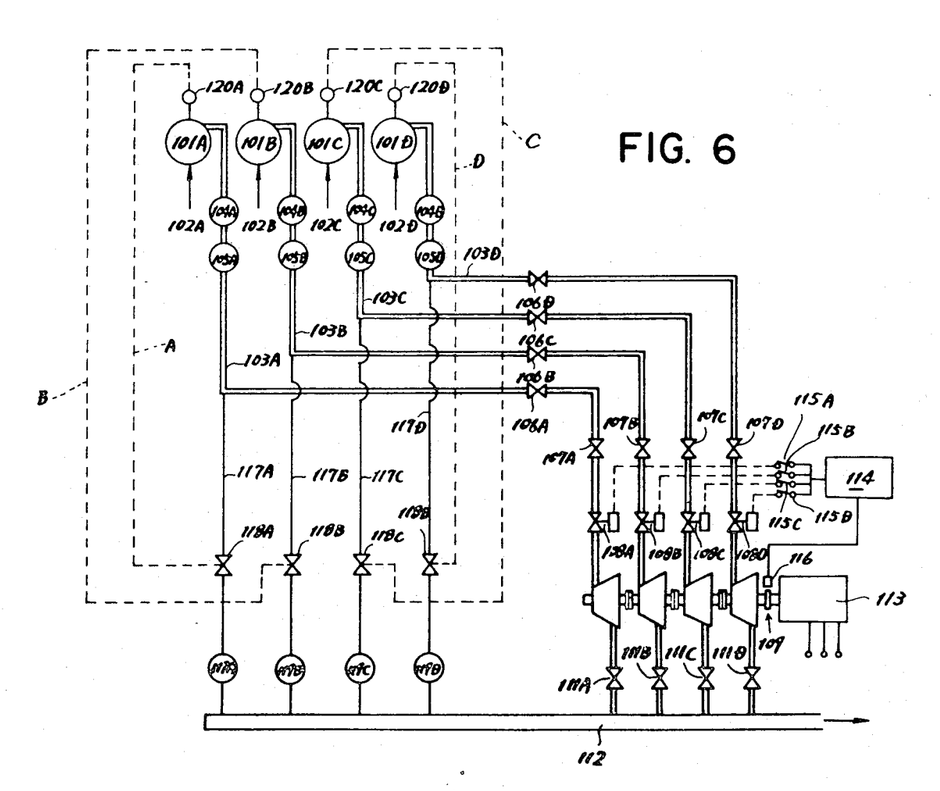
FIG. 6 is a system diagram showing a second embodiment of the invention.

FIG. 6 shows a second embodiment including a plurality of (four in the illustrated case) independent turbines connected in tandom to a generator. For the illustration of the present and following embodiments, a plurality of same elements are referred to by the same reference numeral with suffixes, such as A, B, C, D, etc., attached thereto in the drawings. In the following description, however, the plurality of like elements are referred to by the same reference numeral with such suffixes omitted unless specific reference is needed. Air streams 102 are supplied from an unillustrated blower to blast furnaces 101 during operation. The top gas discharged from the furnaces into main gas channels 103 is passed through venturi scrubbers 104, 105, then through inlet shut-off valves 106, emergency shut-off valves 107 and control valves 108 into gas turbines 110 in a generating unit 109, in which energy is recovered from the gas. The gas is thereafter passed through outlet shut-off valves 111 into a main gas discharge pipe 112. The generating unit 109 comprises one generator 113 and the four gas turbines 110 connected in tandem thereto. A speed control device 114 is connectable to the control valves 108 by way of switches 115 and, when so connected, selectively controls the control valves 108. Indicated at 116 is a unit for detecting the number of revolutions. Secondary gas channels 117 in parallel to the gas turbines 110 are branched from the main gas channels 103, whereby the gas flowing through the venturi scrubbers 105 is passed through septum valves (top pressure adjusting valves) 118 and dust collectors 119 into the main gas discharge pipe 112. The septum valves 118 for adjusting the top pressures are controlled by control signals A, B, C and D from top pressure control devices 120 for detecting the output pressures of the furnaces 101.

When the gas can be fed to the turbines from all the furnaces for starting up the turbines with the above arrangement, one of the control valves is controlled through the speed control device to start up the system first at an optionally selected gas turbine. In the event the gas is not feadable to all the turbines due to the shutdown or condition of a furnace or furnaces, the speed control device is selectively coupled to one of the control valves to supply the gas for start-up from the furnace which is most convenient to operate. This assures a great reduction in the equipment cost. Further when one or two of the furnaces are out of operation, the system is operable for continuous recovery of energy from the other furnaces.

Figure 7:
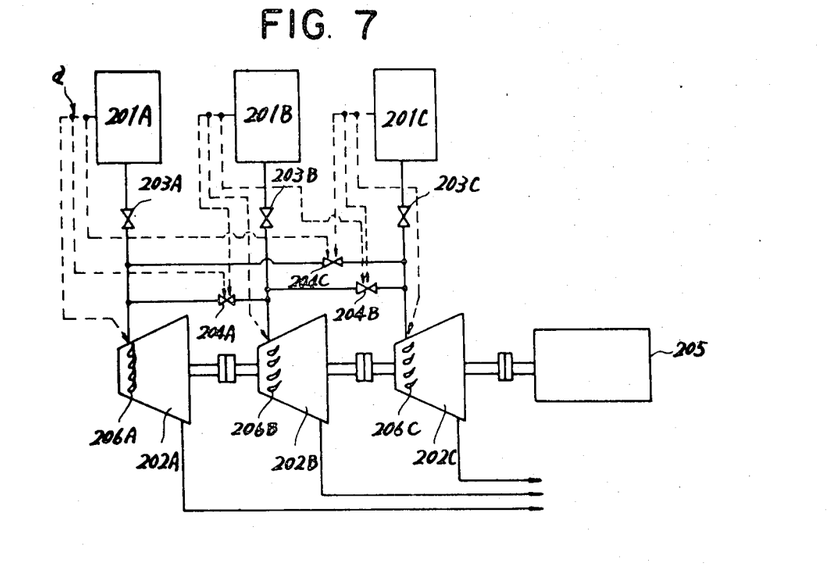
FIG. 7 is a system diagram showing a third embodiment of the invention during operation while preventing overheating of a turbine in idle rotation.
Figure 8:
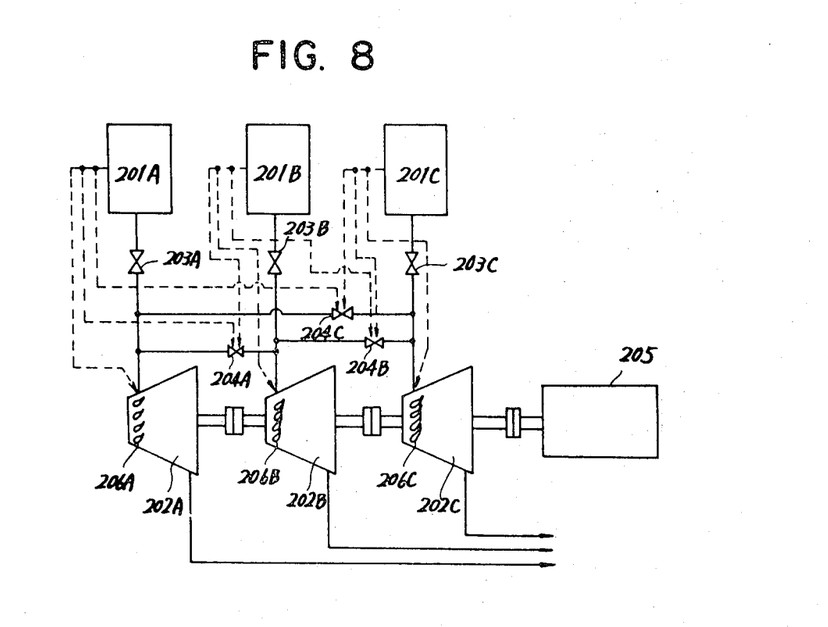
FIG. 8 is a diagram showing the third embodiment during operation for speed control.

FIGS. 7 and 8 show a third embodiment which is not provided with the control valves disposed upstream from the turbines in the foregoing embodiments and in which the top pressures are controlled, during the operation of the generating unit, by adjusting the first movable nozzles of the turbines. The venturi scrubbers, septum valves arranged in parallel to the turbines, etc. are not shown. FIG. 7 shows the system during operation with an idly rotated turbine prevented from overheating while one of the furnaces corresponding to the turbine is out of operation. Indicated at 201 are blast furnaces, at 203 shut-off valves provided between the furnaces 201 and the turbines, and at 204 flow control valves mounted on channels interconnecting the input channels for the turbines 202A and 202B, 202B and 202C, and 202C and 202A. The turbines 202 are connected in tandem to a generator 205. The turbines 202 have first movable nozzles 206. When the gas is fed from all the furnaces 201 with this arrangement, the shut-off valves 203 are fully opened with the flow control valves 204 completely closed, and the gas is supplied to the turbines 202 individually. However, when the gas supply, for example, from the furnace 201A is interrupted, the turbine 202A is idly driven by the other turbines 202B, 202C, with the result that the interior of the turbine 202A will be overheated. To avoid such objection, the flow control valve 204A or 204C, or both of these valves are opened to introduce the gas into the turbine 201A at about 3% of the rated flow rate for cooling. In this case, the flow control valves 204A and/or 204 C may be opened in a preset manner, or in a mode determined by suitable calculation from the gas flows from the furnaces 201B, 201C. Furthermore, a signal a indicating the interruption of gas supply from the furnace 201A selectively opens the flow control valves 204A and/or 204C and, at the same time, closes the movable nozzle 206A almost fully as illustrated to reduce the nozzle opening in accordance with the flow rate. This gives an increased pressure to the first nozzle inlet, enabling the fluid to act effectively when passing through the nozzle, to thereby prevent overheating and afford the energy needed for the idle rotation. This is also true of the embodiment shown in FIG. 2 (as illustrated but not described).

FIG. 8 shows the third embodiment in condition for controlling the rotational speed of a turbine for start-up. In this case, the shut-off valves 203A, 203C, for example, are closed with the movable nozzles 206B, 206C of the turbines 202B, 202C almost fully closed. The flow control valve 204A is opened to a suitable extent to drive the turbine 202A, and the movable nozzle 206A thereof is used for speed control. With the flow control valve 204A giving a suitable pressure reduction loss, the speed is controllable with the movable nozzle 206A. Any turbine is of course usable for speed control. After the generator 205 has been incorporated into a power network upon effecting the speed control, the gas is fed from the furnaces 201 in operation to the corresponding turbines 202 to recover the energy as power. It will be apparent that even when one of the furnaces is out of operation, the system can be started up in the above manner for operating the generator free of any trouble.

The invention is not limited to the individual embodiments described above but includes various combinations of constituents of the embodiments without departing from the scope and spirit of the invention as defined in the appended claims.

What is claimed is:

1. A system for generating power with the top pressure of a plurality of blast furnaces comprising:
   a plurality of turbines provided for the plurality of blast furnaces respectively and aligned on an axis with their rotor shafts connected to one another;
   a generator connected to the rotor shafts;
   a plurality of main gas channels connecting the blast furnaces to the turbines for leading a gas from the top of the furnaces to the turbines and converting the pressure of the gas into rotational energy to generate power, each main gas channel separately connecting one of the blast furnaces to a corresponding one of the turbines; and interconnecting channel means provided with a flow control valve for connecting optionally selected two of the main gas channels.

2. A system as defined in claim 1 wherein a movable nozzle is provided at the intake end of each of the turbines.

3. A system as defined in claim 2 further comprising control means responsive to an interruption in the supply of gas to one of the main gas channels for opening the flow control valve in the interconnecting channel means connecting said one main gas channel to another main gas channel, and for closing the movable nozzle of the turbine connected to said one main gas channel whereby overheating of that turbine is prevented and the energy needed for idle rotation thereof is provided.

4. A system as defined in claim 1 wherein the turbines are so arranged that the intake ends of each pair of adjacent turbines are positioned adjacent to each other with the exhaust ends thereof positioned away from each other, the rotor shafts of the pair of turbines being connected together into a single shaft having no intermediate bearing, a partition being provided between the intake ends for limiting passage of the gas therebetween.

5. A system as defined in claim 1 wherein the turbines are so arranged that the exhaust ends of each pair of the adjacent turbines are positioned adjacent to each other with the intake ends thereof positioned away from each other, the rotor shafts of the pair of turbines being connected together into a single shaft having no intermediate bearing, a partition being provided between the exhaust ends for limiting passage of the gas therebetween.

6. A system as defined in claim 5 which has an outlet chamber communicating with the exhaust end of each of the turbines and a guide wall for directing the exhaust gas from the exhaust end toward the outlet chamber.

7. A system as defined in claim 5 which has outlet chambers communicating with the exhaust ends of the pair of turbines and apertures for holding the outlet chambers in communication with each other to cause the exhaust gas from the turbines to flow together.

8. A system as defined in claim 4 or 5 wherein a bent confluence duct communicates with the exhaust ends of the pair of turbines and has in its interior a perforated partition plate for forming gas channels each communicating with the corresponding one of the exhaust ends, a confluence portion being provided downstream from the perforated partition plate, the bent portion of the duct being provided with bent flow guide plates.

* * * * *